(12) United States Patent
Damian

(10) Patent No.: US 7,182,386 B2
(45) Date of Patent: Feb. 27, 2007

(54) VEHICLE CAP POWER TRANSFER

(75) Inventor: Gerald M. Damian, Elmwood Park, IL (US)

(73) Assignee: Damian Productions, Inc., Elmwood Park, IL (US)

( * ) Notice: Subject to any disclaimer, the term of this patent is extended or adjusted under 35 U.S.C. 154(b) by 252 days.

(21) Appl. No.: 11/003,673

(22) Filed: Dec. 3, 2004

(65) Prior Publication Data

US 2006/0119126 A1 Jun. 8, 2006

(51) Int. Cl.
*B60P 7/02* (2006.01)
(52) U.S. Cl. .............................. 296/100.02; 296/26.04; 340/479; 362/487; 362/541
(58) Field of Classification Search ............. 296/24.33, 296/24.3, 26.04, 37.6, 100.02, 99.1; 340/468, 340/479; 362/459, 487, 493, 541
See application file for complete search history.

(56) References Cited

U.S. PATENT DOCUMENTS

| | | | |
|---|---|---|---|
| 3,857,601 A * | 12/1974 | Robbins | ....................... 296/10 |
| 4,656,563 A | 4/1987 | Segoshi et al. | |
| 4,800,471 A | 1/1989 | Lippert | |
| 4,839,629 A | 6/1989 | Brown | |
| 4,896,136 A | 1/1990 | Hotovy | |
| 4,903,174 A | 2/1990 | Busby | |
| 4,931,697 A | 6/1990 | Nakajima | |
| 5,134,385 A | 7/1992 | Coleman | |
| 5,314,225 A * | 5/1994 | Gordon | ........................ 296/10 |
| 5,424,715 A | 6/1995 | Lietzow et al. | |
| 5,490,704 A * | 2/1996 | Calnan | ........................ 296/24.3 |
| 5,795,051 A * | 8/1998 | Galanski | ....................... 362/485 |
| 5,839,231 A * | 11/1998 | Gebhart et al. | ................ 49/413 |
| 6,357,899 B1 | 3/2002 | Craven | |
| 6,677,856 B2 | 1/2004 | Perlman et al. | |
| 6,783,267 B1 * | 8/2004 | Yeoman et al. | .............. 362/485 |
| 6,799,873 B2 | 10/2004 | Fox | |
| 2004/0007900 A1 * | 1/2004 | Block | .................... 296/193.12 |

* cited by examiner

*Primary Examiner*—Jason Morrow
(74) *Attorney, Agent, or Firm*—Cook, Alex, McFarron, Manzo, Cummings & Mehler, Ltd.

(57) ABSTRACT

A vehicle cap power transfer assembly and method are disclosed for transferring electrical power from lights on the cab of a vehicle to lights on or in a cap which is installed upon a section of the vehicle. Plugs are provided on one end of electrical conductors. The plugs are constructed to be received into the bulb sockets of brake and cargo space illumination lights on the rear of the vehicle cab. The other ends of the conductors are connected to an elevated brake light on the rear of the cap and illumination lights on the interior of the cab, respectively. The electrical conductors are also coupled together by a quick disconnect coupler to facilitate the installation and removal of the cap and the coupling and uncoupling of the electrical conductors.

31 Claims, 2 Drawing Sheets

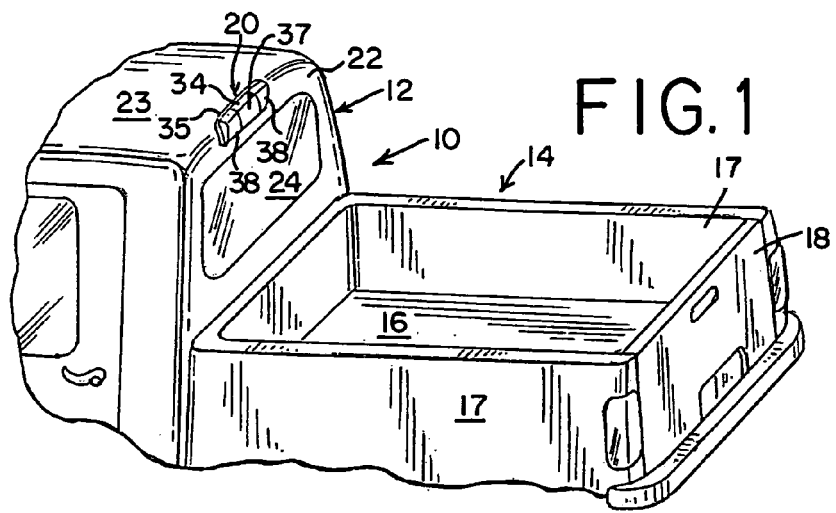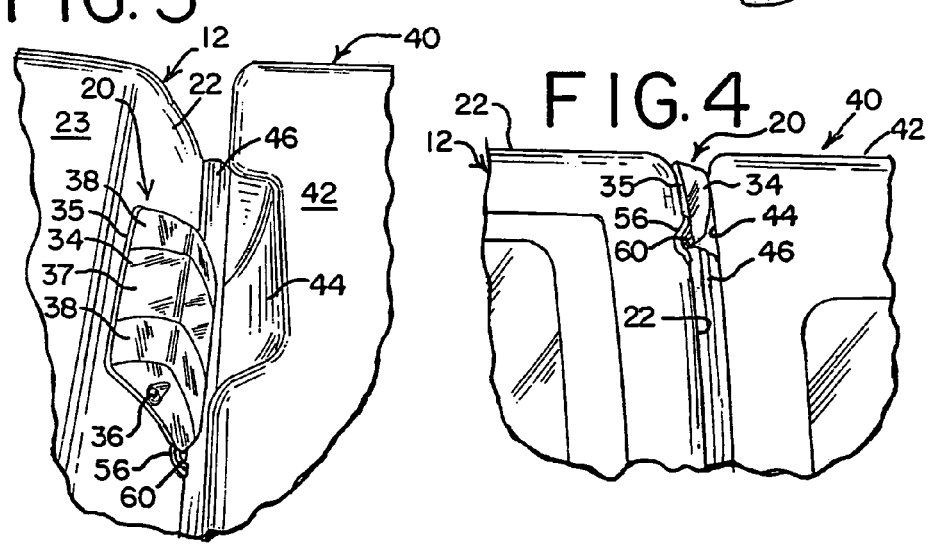

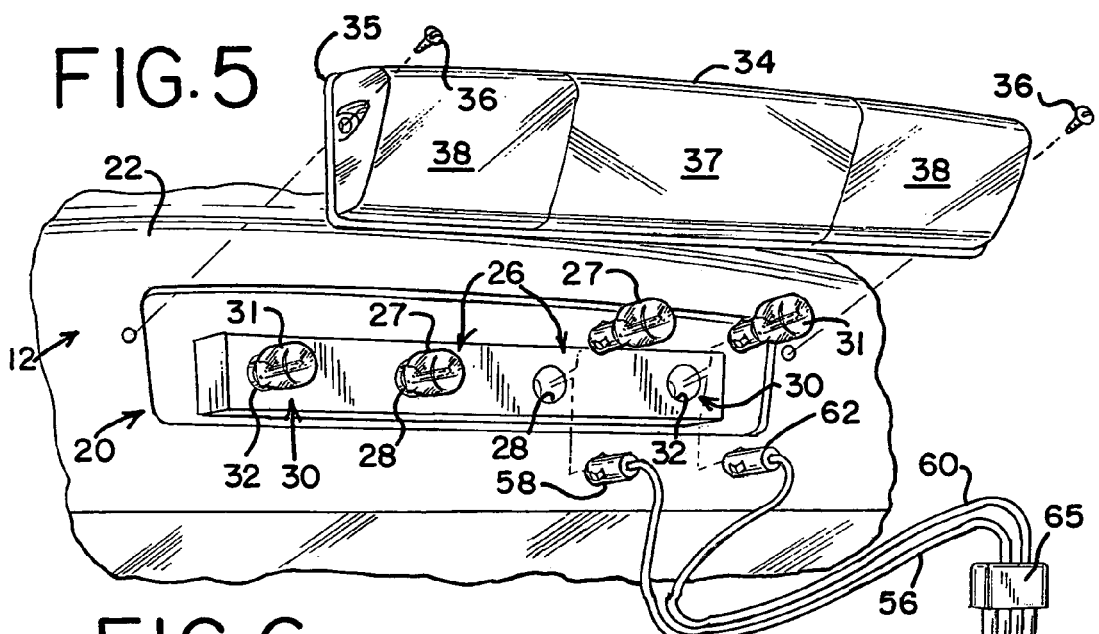
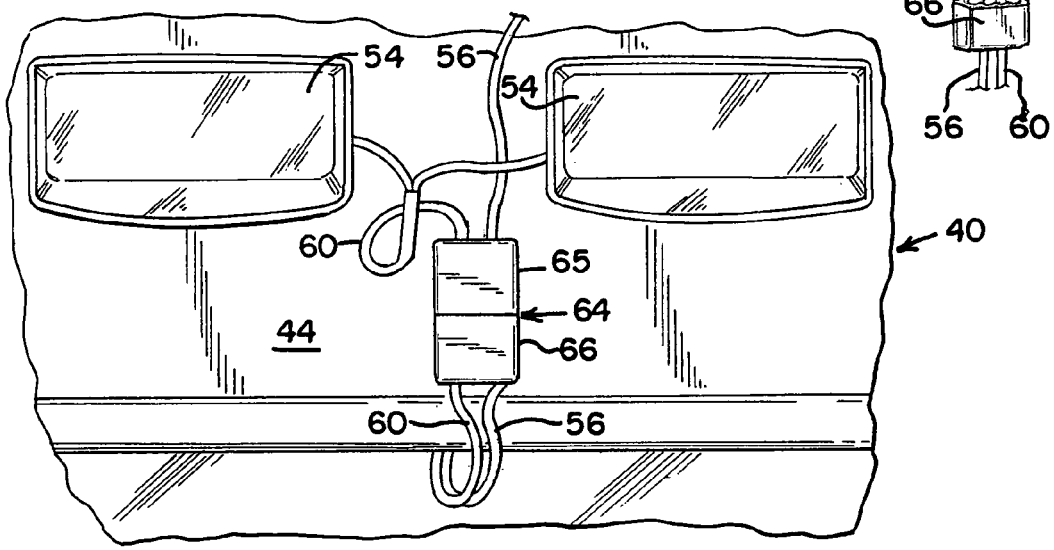
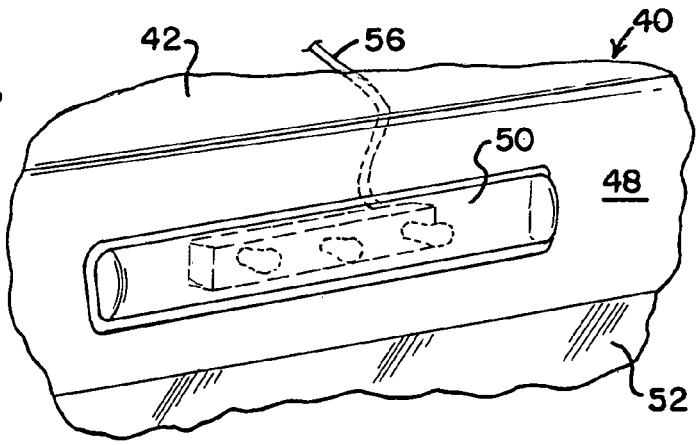

VEHICLE CAP POWER TRANSFER

BACKGROUND AND SUMMARY OF THE INVENTION

The present invention is directed to a power transfer assembly and method for transferring electrical power from a vehicle cab light to a light or lights on or in a cap which is installed on the vehicle.

Various vehicles, such as for example pickup trucks, have a cab for the driver and one or more passengers, and a bed at the rear of the cab for the hauling of cargo and the like. Current laws generally require an elevated brake light which may be viewed from the rear of all vehicles which are to be operated on public streets and roads in addition to the regular brake lights adjacent the rear bumper of such vehicles. In pickup trucks this elevated brake light is frequently positioned on the rear of the cab adjacent the roof and above the cab rear window. Also in more recent pickup truck models, the assembly which contains the elevated brake light also frequently includes an additional light or lights which may be selectively actuated at the cab dashboard to illuminate the cargo area.

Covers or caps are also available for installation on such pickup truck beds to protect the bed and its cargo from the weather. Where the cover or cap is not elevated any considerable distance above the top of the bed side walls, no provision need be made to provide for the continued functionality of the elevated brake light because the brake light is clearly visible to the rear of the vehicle even with the cover installed. However, where the cover or cap includes a roof which is elevated above the truck bed and side walls to an elevation where it is substantially coplanar with the roof of the vehicle cab, the functionality of the elevated cab brake light and its cargo illumination lights if present is lost because the brake light and/or cargo illumination light is blocked by the roof of the elevated cap. With the loss of this functionality of the brake light, the vehicle would typically be in violation of the legal requirement for the presence of an elevated brake light which is viewable from the rear of the vehicle.

In the past the requirement for the elevated brake light viewable from the rear of the vehicle has been satisfied by positioning another such light at the rear of the cap adjacent the roof and above the rear window of the elevated cap. In order to provide electrical power to that cap brake light, a splice was typically made into the conductor leading to the conventional brake lights at the back of the vehicle. Where illumination of the cargo area was also desired, an additional cargo light or lights were also provided in the interior of the cap. In order to provide power to these cargo lights in the cap, a connection was made either directly to the battery of the vehicle or a splice was made into the conductor leading to the parking lights on the rear of the vehicle.

The need for such splicing into and unsplicing out of these conductors was time consuming, cumbersome and substantially delayed the installation or removal of the cap. Moreover, where the cargo lights in the cap were connected either to the battery or spliced into the conductor leading to the parking lights, separate provision had to be made other than the simple dashboard switch for turning the cargo lights on and off.

In the present invention the bulb sockets in the cab lights are utilized directly to transfer electrical power to the elevated cap brake light at the rear of the cap and, where present, to the cargo illumination light or lights in the cap. In addition, a quick disconnect coupler is also preferably provided in the electrical conductor(s) between the cab light(s) and the cap light(s) which may be quickly connected or disconnected during the installation or removal of the cap. Thus, with the present invention, it is unnecessary to splice and unsplice wires upon installation or removal of the cap from the truck, thereby eliminating time consuming, cumbersome and delaying disadvantages resulting from such splicing. Moreover, in the present invention all of the components are protected from the weather and, where the cargo illumination light is present, it may continue to be operated from the dash board control as was the cargo light in the cab mounted cargo illumination light assembly. And in the present invention, the entire assembly may be installed by the cap manufacturer as part of the cap assembly and may be permanently kept with the cap in its non-installed condition and thereby prevent loss of any of these components.

In one principal aspect of the present invention, a vehicle has a cab and a section to the rear of the cab, a cap which is capable of being positioned on the section to close it, and a first cab light on the cab and facing the section. The first cab light comprises a bulb socket into which a light bulb may be positioned, and a second cap light on the cap. An assembly for transferring electrical power between the first cab and the second cap lights comprises an electrical conductor having one end connected to the second cap light, and a plug adjacent the other end of the conductor. The plug is constructed to be received into the bulb socket of the first cab light when the light bulb has been removed. When the cap is not positioned on the section, the first cab light on the cab is functional, and when the cap is positioned on the section to close it, the second cap light on the cap is capable of being energized through the bulb socket, plug and conductor.

In another principal aspect of the present invention, a method of transferring electrical power between lights on the cab of a vehicle and a cap on the vehicle comprises providing a cab on the vehicle with a first cab light on the rear of the cab, the first cab light including a light bulb socket in which a light bulb is positioned, a section to the rear of the cab, and a cap which is adapted to be installed on the section, the cap including a second cap light thereon. The light bulb is removed from the light bulb socket of the first cab light, and a plug is inserted adjacent an end of an electrical conductor into the light bulb socket, and the electrical conductor is adapted to be connected to the second cap light so that when the cap is installed on the section, electrical power is transmitted from the light bulb socket of the first cab light, through the electrical conductor and to the second cap light.

In still another principal aspect of the present invention, the first cab light and second cap light are brake lights.

In still another principal aspect of the present invention, the first cab light and second cap light are capable of illuminating the section of the vehicle.

In still another principal aspect of the present invention, the first cab light and second cap light are brake lights, a third cab light on the cab faces the section, the third cab light comprising a bulb socket into which a light bulb may be positioned, and the third cab light is capable of illuminating the section when the cap does not close the section. A fourth cap light on the cap is capable of illuminating the section when the cap closes the section. A first electrical conductor has one end connected to the second cap light, and a plug adjacent the other end of the first electrical conductor is constructed to be received into the bulb socket of the first cab light when the light bulb has been removed. A second electrical conductor has one end connected to the fourth cap light, and a plug adjacent the other end of the second conductor constructed to be received into the bulb socket of the third cab light when the light bulb has been removed. When the cap is not positioned on the section, the first and third cab lights on the cab are functional, and when the cap is positioned on the section to close it, the second and fourth cap lights on the cap are electrically energizeable through their respective bulb sockets, plugs and first and second electrical conductors.

In still another principal aspect of the present invention, the assembly includes a quick disconnect coupler in the electrical conductor or conductors, and the coupler has first and second parts. A first portion of the conductor or conductors extend between the first part of the coupler and the plug or plugs, and a second portion of the conductor or conductors extend between the second part of the coupler to the cap light on the cap. When the cap is not positioned on the section, the cab light or lights on the cab are functional, and when the cap is positioned on the section to close it, the cap light or lights on the cap may be energized through the bulb socket, plug, first portion of the conductor, quick disconnect coupler and second portion of the conductor.

In still another principal aspect of the present invention, the cab light or lights include a lens cover for the light bulb socket or sockets and light bulb or bulbs. The lens cover and light bulb or bulbs are removed, the plug or plugs adjacent the end of the electrical conductor or conductors are inserted into the light bulb socket or sockets, and the lens cover is replaced on the cab light or lights with the electrical conductor or conductors extending therebeneath and toward the vehicle section These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a broken perspective view of a pickup truck cab and open bed and in which the cab has a elevated cab light at the rear;

FIG. 2 is a broken perspective view of the pickup truck of FIG. 1, but in which a cap has been installed on the open bed to cover it;

FIG. 3 is a broken perspective view of the junction between the cab and cap substantially as shown in FIG. 2 including the cab light;

FIG. 4 is a broken side elevation view of the cab, cab light and cap substantially as shown in FIG. 3;

FIG. 5 is an exploded broken rear view of the cab light assembly substantially as shown in FIGS. 2–4;

FIG. 6 is a broken rear elevation view of the interior front wall of the cap showing the positioning of cargo illumination lamps therein; and FIG. 7 is a broken perspective view of the rear of the cap showing the cap brake light assembly.

DESCRIPTION OF THE PREFERRED EMBODIMENT

With particular reference to FIGS. 1 and 2 a vehicle 10, such as a pickup truck, generally includes a cab 12 in which the driver and one or more passengers may ride. A section 14 of the vehicle, such as a pickup truck bed 16, having side walls 17 and a tailgate 18 is positioned to the rear of the cab as best seen in FIGS. 1 and 2.

An elevated cab light 20 is typically positioned and at the rear of the cab 12 on the rear wall 22 of the cab adjacent the intersection of the rear wall and the roof 23 of the cab and above the rear window 24 of the cab. The cab light 20 typically comprises one or more brake lights 26 as best seen in FIG. 5 which comprise light bulbs 27 which are constructed to fit into brake light bulb sockets 28. In addition, the cab light 20 may also include one or more illumination lights 30 which are adapted to be selectively actuated, for example by a switch (not shown) at the dash board of the cab, to illuminate the truck bed 16 and any cargo therein. The illumination lights 30 also preferably comprise light bulbs 31 which are constructed to fit into light bulb sockets 32.

The cab light 20 is preferably completed by a translucent lens cover 34 having a gasket 35 which seals the cab light against water when the lens cover is attached to the cab light by a suitable removable fastener 36, such as a screw. In order to avoid the need for different colored bulbs to distinguish the brake lights and the illumination lights, the lens cover 34 is preferably formed of a red portion 37 for the brake lights and a clear or uncolored frosted portion 38 for the illumination lights.

The pickup truck vehicle 10 thus far described fully complies with the current safety requirements for the presence of a functional elevated brake light at the rear of the cab 12 which is visible from the rear of the vehicle. However, if a cap 40, as best seen in FIG. 2, is to be installed on the bed 16 and which contains an elevated roof 42 which is essentially coplanar with the cab roof 23, it will be seen that the cab light 20 and its brake lights 26 become nonfunctional because they are blocked from view to the rear of the vehicle by the cap 40. Moreover, the illumination light 30 if present on the cab light 20 also becomes nonfunctional because it is blocked from illuminating the truck bed 16 by the front wall 44 of the cap 40 as well as the cap sealing gasket 46. The sealing gasket 46 typically extends just beneath the cab light 20, as best seen in FIGS. 3 and 4, and bears against the cab rear wall 22 to seal the pickup bed 16 against the entry of water. Accordingly, the rear wall 48 of the cap 40 is provided with a cap brake light 50 adjacent the intersection of the cap roof 42 and rear wall 48 and above the rear window 52 of the cap. Alternatively, the cap brake light 50 may be positioned inside the rear window of the cap to shine through the rear window 52.

If it is desired to also maintain the ability to illuminate the truck bed 16, one or more illumination lights 54 may also be provided on the interior of the cap 40 as seen in FIG. 6. Although the illumination lights 54 as shown in FIG. 6 are mounted to the inside of the front wall 44 of the cap, it will be appreciated that they may be mounted elsewhere, such as for example, on the side walls of the cap or on the underside of the roof 42 of the cap.

In the present invention an assembly is provided for the transfer of electrical power to the cap brake light 50 and illumination lights 54, if present, from the cab light 20. The assembly of the present invention avoids the need for the splicing of electrical conductors and permits rapid and easy installation of the cap onto or removed from the vehicle 10.

In the power transfer assembly of the present invention an electrical conductor 56 is provided which at one end is connected to the cap brake light 50, as seen in FIG. 7, and at the other end includes a plug 58, as seen in FIG. 5, which is constructed to fit into at least one of the brake light sockets 28 when its bulb 27 is removed. If it is also desired to illuminate the truck bed 16, another electrical conductor 60 is also provided which is connected at one end to one or more of the illumination lights 54 in the cap, as best seen in FIG. 6, and at the other end contains a plug 62 which is constructed to fit into the socket 32 of the illumination light 30 when its bulb 31 has been removed, as best seen in FIG. 5. Although only one plug 58 is shown to be plugged into only one socket 28 of the brake light 26 and one plug 62 into one socket 32 of the illumination light 30, it will be appreciated that more plugs may be included on the end of the electrical connectors 56 and 60 so that all of the light bulbs 27 and 31 which become nonfunctional when the cap 40 is installed on the vehicle may be replaced by the plugs 58 and 62.

Thus, it will be seen that the need for splicing into conductors is obviated and that connection of the conductors 56 and 60 into the system is simply carried out by plugging into the existing light sockets 28 and 32 from which the now non-functional light bulbs 27 ad 31 have been removed.

In the assembly of the present invention, it is also preferred to provide a quick disconnect coupler 64 to facilitate and expedite the connection and disconnection of the electrical conductors during the installation or removal of the cap 40. As seen in FIGS. 5 and 6, the quick disconnect coupler 64 includes two separable parts 65 and 66. Part 65 is connected to the portions of the electrical conductors 56 and 60 which extend to the cab brake lights 26 and cab illumination lights 30 and the plugs 58 and 62 respectively. Part 66 is connected to the portions of the electrical connectors 56 and 60 which extend to the cap brake light 50 and cap illumination lights 54.

Although it is believed that the installation of the cap 40 together with the assembly for the transfer of electrical power will be readily understood by those skilled in the art from the foregoing description, a brief description of such installation follows.

To commence the installation, the cab light 20 lens cover 34 is first removed by unscrewing the fasteners 36 as shown in FIGS. 3 and 5. With the quick disconnect coupler 64 uncoupled as seen in FIG. 5, a brake light bulb 27 is removed from a brake light socket 28, and the plug 58 of the electrical conductor 56 is inserted into the socket. If cargo illumination is also to be achieved, one of the illumination bulbs 31 is also removed from its socket 32, and the plug 62 of electrical conductor 60 is inserted into that open socket. As previously mentioned, if more than one plug 58 and/or 62 are provided on the conductors 56 and 60 respectively, some or all of the additional brake light bulbs 27 and/or illumination bulbs 31 may also be replaced by electrical conductor plugs 58 and 62.

Once the plugs 58 and 62 have been inserted into the appropriate cab light 20 sockets 28 and 32, the lens cover 34 is again repositioned onto the cab light 20 so that the conductors 56 and 60 extend between the rear cab wall 22 and gasket 35 on the lens cover 34. The conductors 56 and 60 are relatively small so that the lens cover gasket 35 which is relatively substantial is sufficient to ensure passage of the conductors and still maintain the fluid seal in the cab light. Although the conductors 56 and 60 are shown in FIGS. 3 and 4 as passing through the side of the lens cover 34 for purposes of illustration, it is generally preferred that instead they pass though the bottom of the lens cover and then finally through the cap sealing gasket 46 and into the interior of the cap 42 following installation of the cap. This provides the greatest protection for the conductors and the maximum fluid seal not only to the interior of the cap light 20 but also though the cap ceiling gasket 46 and to the interior of the cap 40.

The next step is now to install the cap 40 onto the top of the side walls, 17 of the bed 16 as shown in FIGS. 2–4. As the cap 40 is being installed, the electrical conductors 56 and 60 and quick disconnect coupler part 65 will be positioned to hang downwardly over the rear window 24 of the cab 12 so that the cap sealing gasket 46 may be pushed snugly against the rear cab wall 22 to seal against that wall. In this condition, the conductors 56 and 60 will extend downwardly between the ceiling gasket 46 and the rear cab wall 22 and into the interior of the cap together with the quick disconnect coupler part 65.

Once the cap 40 is finally positioned and secured on the truck bed 16, all that need be done is to couple together the quick disconnect coupler parts 65 and 66 thus completing the power transfer circuit from the cap light 20 brake socket or sockets 28 and illumination socket or sockets 32, the plugs 58 and 62, the initial part of the electrical conductors 56 and 60 through coupler part 65 and on though coupler part 66 and the remaining portions of the electrical conductors 56 and 60 which have already been preinstalled and connected to the cap brake light 50 and cap illumination lights 54.

In order to remove the cap 40 all that need be done is to reverse the foregoing steps. Once the cap is removed, the quick disconnect coupler part 65 together with its conductors 56 and 60 and plugs 58 and 62 may simply be coupled with quick disconnect coupler part 66 which is premantly on the cap for storage of the cap and the entire electrical power transfer assembly and to ensure against loss of the assembly parts.

From the above description it will be appreciated that in the present invention it is unnecessary to splice and unsplice wires upon installation or removal of the cap from the truck. All that need be done to install the cap is to remove the lens cover from the preexisting cab rear light assembly, install the two plugs connected to one part of the quick disconnect coupler into the brake and cargo illumination bulb sockets respectively, reinstall the cab light lens cover to seal the assembly, install the cap on the truck, and couple the two parts of the quick disconnect coupler together. To remove the cap, these steps are simply reversed. Moreover, the entire assembly including the quick disconnect coupler and plugs on the lead ends which fit into the bulb sockets, may be installed by the cap manufacturer as part of the cap, and may be permanently kept with the cap in its non-installed condition and thereby prevent loss of any of these components.

It will also be appreciated that although the vehicle described herein is a pickup truck in which the cap is installed on its bed section, other vehicles may be employed in which a section to be covered with a cap is not a truck bed. For example, an automotive vehicle may be employed having a trunk section which is to be closed with a cap or cover.

It will also be understood that the preferred embodiment of the present invention which has been described is merely illustrative of the principles of the present invention. Numerous modifications may be made by those skilled in the art without departing from the true spirt and scope of the invention.

I claim:

1. In a vehicle having a cab and a section to the rear of the cab; a cap which is capable of being positioned on the section to close it; a first cab light on the cab and facing the section; the first cab light comprising a bulb socket into which a light bulb may be positioned; and a second cap light on the cap; the improvement comprising an assembly for transferring electrical power between said first cab and the second cap lights, said assembly comprising:
   a first electrical conductor having one end connected to said second cap light;
   a plug adjacent the other end of said conductor and which is constructed to be received into the bulb socket of the first cab light when the light bulb has been removed; and
   whereby when the cap is not positioned on the section, the first cab light on the cab is functional; and when the cap is positioned on the section to close it, the second cap light on the cap is capable of being energized through said bulb socket, plug and conductor.

2. The vehicle of claim 1, wherein the first cab light and second cap light are brake lights.

3. The vehicle of claim 1, wherein the first cab light and second cap light are capable of illuminating the section of the vehicle.

4. The vehicle of claim 1, wherein the first cab light and second cap light are brake lights;
   a third cab light on the cab and facing the section, the third cab light comprising a bulb socket into which a light bulb may be positioned, said third cab light being capable of illuminating the section when the cap does not close the section;
   a fourth cap light on the cap; said fourth cap light being capable of illuminating the section when the cap closes the section;
   a plug adjacent the other end of said first electrical conductor and which is constructed to be received into the bulb socket of said first cab light when the light bulb has been removed;
   a second electrical conductor having one end connected to said fourth cap light; and
   a plug adjacent the other end of said second conductor and which is constructed to be received into the bulb socket of said third cab light when the light bulb has been removed;
   whereby when said cap is not positioned on said section, the first and third cab lights on the cab are functional; and when said cap is positioned on said section to close it, the second and fourth cap lights on the cap are electrically energizeable through their said respective bulb sockets, plugs and said first and second electrical conductors.

5. The vehicle of claim 1, wherein said assembly includes a quick disconnect coupler in said first electrical conductor, said coupler having first and second parts;
   a first portion of said conductor extending between the first part of the coupler and said plug which is constructed to be received into said bulb socket when the light bulb has been removed; and
   a second portion of said conductor extending between the second part of the coupler to said second cap light on the cap;
   whereby when said cap is not positioned on said section, the first cab light on the cab is functional; and when said cap is positioned on said section to close it, the second cap light on the cap may be energized through said bulb socket, plug, first portion of said conductor, quick disconnect coupler and second portion of said conductor.

6. The vehicle of claim 5, wherein the first cab light and second cap light are brake lights.

7. The vehicle of claim 5, wherein said first cab light and second cap light are capable of illuminating the section of the vehicle.

8. The vehicle of claim 5, wherein the first cab light and second cap light are brake lights;
   a third cab light on the cab and facing the section; the third cab light comprising a bulb socket into which a light bulb may be positioned, said third cab light being capable of illuminating the section when turned on and when the cap does not close the section;
   a fourth cap light on the cap; said fourth cap light being capable of illuminating the section when the cap closes the section;
   a plug adjacent the other end of said first electrical conductor and which is constructed to be received into the bulb socket of said first cab light when the light bulb has been removed;
   a second electrical conductor having one end connected to said fourth cap light; and
   a plug adjacent the other end of said second conductor and which is constructed to be received into the bulb socket of said third cab light when the light bulb has been removed;
   whereby when said cap is not positioned on said section, the first cab and third cab lights on the cab are functional; and when said cap is positioned on said section to close it, the second and fourth cap lights on the cap are energizeable through their said respective bulb sockets, plugs and said first and second electrical conductors.

9. A vehicle electrical power transfer assembly comprising:
   a plug constructed to plug into a bulb socket in a first cab light on the rear of the cab of a vehicle; and
   a first electrical conductor connected to said plug and adapted to be connected to a second cap light in a cap of the vehicle when the cap is installed on the vehicle to transfer electrical power from the first cab light to the second cap light when the cap is installed on the vehicle.

10. The assembly of claim 9, wherein the first cab light and second cap light are brake lights.

11. The assembly of claim 9, wherein the first cab light and second cap light are capable of illuminating a section of the vehicle.

12. The assembly of claim 9, wherein the first cab light and second cap light are brake lights;
   a first plug adjacent the other end of said first electrical conductor and which is constructed to be received into a bulb socket of the first cab light when the light bulb has been removed;
   a second electrical conductor having one end which as adapted to be connected to a fourth cap light on the vehicle; and
   a second plug adjacent the other end of said second electrical conductor and which is constructed to be received into a bulb socket of a third cab light when the light bulb has been removed;
   whereby when the cap is not installed on the vehicle, the first and third cab lights on the cab are functional; and when the cap is installed on the vehicle, the second and fourth cap lights on the cap are energizeable through their said respective bulb sockets, plugs and said first and second electrical conductors.

13. The assembly of claim 9, wherein said assembly includes a quick disconnect coupler in said first electrical conductor, said coupler having first and second parts;
   a first portion of said conductor extending between the first part of the coupler and said plug which is constructed to be received into the bulb socket when the light bulb has been removed; and a second portion of said conductor extending between the second part of the coupler to the second cap light on the cap;

whereby when the cap is not installed on the vehicle, the first cap light on the cab is functional; and when the cap is on the vehicle, the second cap light on the cap is energized through said bulb socket, plug, first portion of said conductor, quick disconnect coupler and second portion of said conductor.

14. The assembly of claim 13, wherein the first cab light and second cap light are brake lights.

15. The assembly of claim 13, wherein said first cab light the second cap lights are capable of illuminating a section of the vehicle.

16. The assembly of claim 13, wherein the first cab light and second cap light are brake lights;

a first plug adjacent the other end of said first electrical conductor and which is constructed to be received into a bulb socket of the first cab light when the light bulb has been removed;

a second electrical conductor having one end which as adapted to be connected to a fourth cap light on the vehicle; and a second plug adjacent the other end of said second electrical conductor and which is constructed to be received into a bulb socket of a third cap light when the light bulb has been removed;

whereby when the cap is not installed on the vehicle, the first and third cap lights on the cab are functional; and when the cap is installed on the vehicle, the second and fourth cap lights on the cap are elecrically energizeable through their said respective bulb sockets, plugs and said first and second electrical conductors.

17. A method of transferring electrical power between lights on the cab of a vehicle and a cap on the vehicle comprising:

providing a cab on the vehicle with a first cab light on the rear of the cab, the first cab light including a light bulb socket in which a light bulb is positioned; a section to the rear of the cab; and a cap which is adapted to be installed on said section, said cap including a second cap light thereon;

removing the light bulb from the light bulb socket of the first cab light; and inserting a plug adjacent an end of a first electrical conductor into said light bulb socket, said electrical conductor adapted to be connected to the second cap light so that when the cap is installed on the section, electrical power is transmitted from said light bulb socket of the first cab light, through the electrical conductor and to the second cap light.

18. The method of claim 17, wherein the first cab light and second cap light are brake lights.

19. The method of claim 17, wherein the first cab light and second cap light are capable of illuminating the section of the vehicle.

20. The method of claim 17, wherein the first cab light and second cap light are brake lights, and including a third cab light on the cab and facing the section, the third cab light also comprising a bulb socket into which a light bulb is positioned, the third cab light being capable of illuminating the section when the cap does not close the section; and a fourth cap light on the cap; the fourth cap light being capable of illuminating the section when the cap does close the section;

removing the light bulbs from the bulb sockets of both the first and third cab lights;

inserting a plug adjacent one end of the first electrical conductor into the light bulb socket of the first cab light, said first electrical conductor being adapted to be connected to the second cap light so that when the cap is installed on the section electrical power is transmitted from the light bulb socket of the first cab light to the second cap light; and inserting a plug adjacent one end of a second conductor into the light bulb socket of said third cap light, said second electrical conductor being adapted to be connected to the fourth cap light so that when the cap is installed on the section, electrical power is transmitted from the light bulb socket of the second cab light to the fourth cap light.

21. The method of claim 17, including providing a quick disconnect coupler in the first electrical conductor, the coupler having first and second parts with a first portion of the conductor extending between the first part of the coupler and the plug; and a second portion of said conductor extending between the second part of the coupler to said second cap light on the cap; and coupling the first and second parts of the quick disconnect coupler together to electrically connect the first and second portions of the electrical conductor together.

22. The method of claim 21, wherein the first cab light and second cap light are brake lights.

23. The method of claim 21, wherein said first cab light the second cap lights are capable of illuminating the section of the vehicle.

24. The method of claim 21, wherein the first cab light and second cap light are brake lights, and including a third cab light on the cab and facing the section, the third cab light also comprising a bulb socket into which a light bulb is positioned, said third cab light being capable of illuminating the section when turned on and when the cap does not close the section; and a fourth cap light on the cap; said fourth cap light being capable of illuminating the section when the cap does close the section;

removing the light bulbs from the bulb sockets of both the first and third cab lights;

inserting a plug adjacent one end of the first electrical conductor into the light bulb socket of the first cab light, said first electrical conductor being adapted to be connected to the second cap light so that when the cap is installed on the section, electrical power is transmitted from the light bulb socket of the first cab light to the second cap light; and inserting a plug adjacent one end of a second conductor into the light bulb socket of said third cap light, said second electrical conductor being adapted to be connected to the fourth cap light so that when the cap is installed on the section, electrical power is transmitted from the light bulb socket of the second cab light to the fourth cap light.

25. The method of claim 17, wherein the first cab light includes a lens cover for the light bulb socket and light bulb, removing the lens cover;

removing the light bulb;

inserting the plug adjacent the end of the first electrical conductor into the light bulb socket; and replacing the lens cover on the first cab light with the electrical conductor extending therebeneath and toward the vehicle section.

26. The method of claim 18, wherein the first cab light includes a lens cover for the light bulb socket and light bulb,
   removing the lens cover;
   removing the light bulb;
   inserting the plug adjacent the end of the first electrical conductor into the light bulb socket; and
   replacing the lens cover on the first cab light with the electrical conductor extending therebeneath and toward the vehicle section.

27. The method of claim 19, wherein the first cab light includes a lens cover for the light bulb socket and light bulb,
   removing the lens cover;
   removing the light bulb;
   inserting the plug adjacent the end of the first electrical conductor into the light bulb socket; and
   replacing the lens cover on the first cab light with the electrical conductor extending therebeneath and toward the vehicle section.

28. The method of claim 20, wherein the first and third cab lights include a lens cover for their respective light bulb sockets and light bulbs,
   removing the lens cover;
   removing the light bulbs of the first and third cab lights;
   inserting the plug adjacent the end of each of the first and second electrical conductors into the respective light bulb sockets; and
   replacing the lens cover on the first and second cab lights with the first and second electrical conductors extending therebeneath toward the vehicle section.

29. The method of claim 22, wherein the first cab light includes a lens cover for the light bulb socket and light bulb,
   removing the lens cover;
   removing the light bulb;
   inserting the plug adjacent the end of the first electrical conductor into the light bulb socket; and
   replacing the lens cover on the first cab light with the electrical conductor extending therebeneath and toward the vehicle section.

30. The method of claim 23, wherein the first cab light includes a lens cover for the light bulb socket and light bulb,
   removing the lens cover;
   removing the light bulb;
   inserting the plug adjacent the end of the first electrical conductor into the light bulb socket; and
   replacing the lens cover on the first cab light with the electrical conductor extending therebeneath and toward the vehicle section.

31. The method of claim 28, wherein the first and third cab lights include a lens cover for their respective light bulb sockets and light bulbs,
   removing the lens cover;
   removing the light bulbs of the first and third cab lights;
   inserting the plug adjacent the end of each of the first and second electrical conductors into the respective light bulb sockets; and
   replacing the lens cover on the first and second cab lights with the first and second electrical conductors extending therebeneath toward the vehicle section.

* * * * *